(12) United States Patent
Takahashi

(10) Patent No.: US 12,240,530 B2
(45) Date of Patent: Mar. 4, 2025

(54) STEERING DEVICE

(71) Applicant: KYB Corporation, Tokyo (JP)

(72) Inventor: Kazuki Takahashi, Gifu (JP)

(73) Assignee: KYB CORPORATION, Tokyo (JP)

( * ) Notice: Subject to any disclaimer, the term of this patent is extended or adjusted under 35 U.S.C. 154(b) by 592 days.

(21) Appl. No.: 17/624,220

(22) PCT Filed: Mar. 2, 2020

(86) PCT No.: PCT/JP2020/008671
§ 371 (c)(1),
(2) Date: Dec. 30, 2021

(87) PCT Pub. No.: WO2021/009964
PCT Pub. Date: Jan. 21, 2021

(65) Prior Publication Data
US 2022/0348255 A1    Nov. 3, 2022

(30) Foreign Application Priority Data
Jul. 12, 2019  (JP) ................................. 2019-130500

(51) Int. Cl.
*B62D 3/12*  (2006.01)
*B62D 5/22*  (2006.01)

(52) U.S. Cl.
CPC . *B62D 3/12* (2013.01); *B62D 5/22* (2013.01)

(58) Field of Classification Search
CPC .................................. B62D 3/12; B62D 5/22
See application file for complete search history.

(56) References Cited

U.S. PATENT DOCUMENTS

| | | | |
|---|---|---|---|
| 8,272,785 B2* | 9/2012 | Hirose | F16C 33/20 |
| | | | 384/220 |
| 8,696,207 B2* | 4/2014 | Tange | F16C 29/02 |
| | | | 384/215 |
| 9,995,337 B2* | 6/2018 | Ikeda | F16C 35/02 |
| 11,548,546 B2* | 1/2023 | Sekine | F16C 29/02 |
| 2010/0239199 A1* | 9/2010 | Nakagawa | B62D 5/0409 |
| | | | 384/283 |
| 2017/0130769 A1 | 5/2017 | Ikeda et al. | |

FOREIGN PATENT DOCUMENTS

| CN | 107021128 A | 8/2017 |
|---|---|---|
| JP | 2009-227030 A | 10/2009 |
| JP | 2017-087972 A | 5/2017 |

* cited by examiner

*Primary Examiner* — Kevin Hurley
(74) *Attorney, Agent, or Firm* — Rabin & Berdo, P.C.

(57) ABSTRACT

A steering device includes a rack shaft that turns wheels, a bush slidably support the rack shaft, tie-rods joined to the rack shaft, boots that cover a joining portion that joins the rack shaft and the tie-rod. A protrusion part is formed on either one of the bush and a rack housing so as to protrude toward the other. A restriction groove into which the protrusion part is inserted is formed on the other. A space inside the first boot and a space inside the second boot constantly communicate with each other via the restriction groove.

6 Claims, 6 Drawing Sheets

STEERING DEVICE

TECHNICAL FIELD

The present invention relates to a steering device.

BACKGROUND ART

JP2009-227030A discloses a steering device including a rack shaft that turns wheels by transmitting a steering force, a housing that accommodates the rack shaft, bushes provided in the housing to slidably support the rack shaft, tie-rods each swingably joined to the rack shaft, and boots each covering a joining portion that joins the rack shaft and the tie-rod. In this steering device, when the rack shaft reciprocates, the space inside each boot expands or contracts according to this movement.

SUMMARY OF INVENTION

In the steering device described in JP2009-227030A, because of the presence of grease or lubricating oil, there is almost no gap through which air can pass between the bush and the housing or between the bush and the rack shaft. Therefore, the space inside each boot is kept in almost hermetically sealed state. Hermetically sealing the space inside the boot in this manner does not enable air to enter or leave the space inside the boot, even when the boot expands and contracts according to a reciprocating movement of the rack shaft. Therefore, the boot made of rubber or resin may be extremely deformed and damaged.

The present invention intends to suppress deformations of boots.

According to one aspect of the present invention, a steering device includes: a turning shaft configured to turn wheels by transmitting a steering force; a housing configured to accommodate the turning shaft; a bush provided in the housing to slidably support the turning shaft; first and second tie-rods swingably joined to the turning shaft; a first boot provided on the housing to cover a joining portion that joins the turning shaft and the first tie-rod; and a second boot provided on the housing to cover a joining portion that joins the turning shaft and the second tie-rod, wherein either one of the bush and the housing has a protrusion part formed so as to protrude toward the other, and the other has a restriction groove into which the protrusion part is inserted so as to be formed along an axial direction of the turning shaft, and a space inside the first boot and a space inside the second boot constantly communicate with each other via the restriction groove.

DESCRIPTION OF EMBODIMENTS

Hereinafter, embodiments of the present invention will be described with reference to attached drawings.

Figure 1:
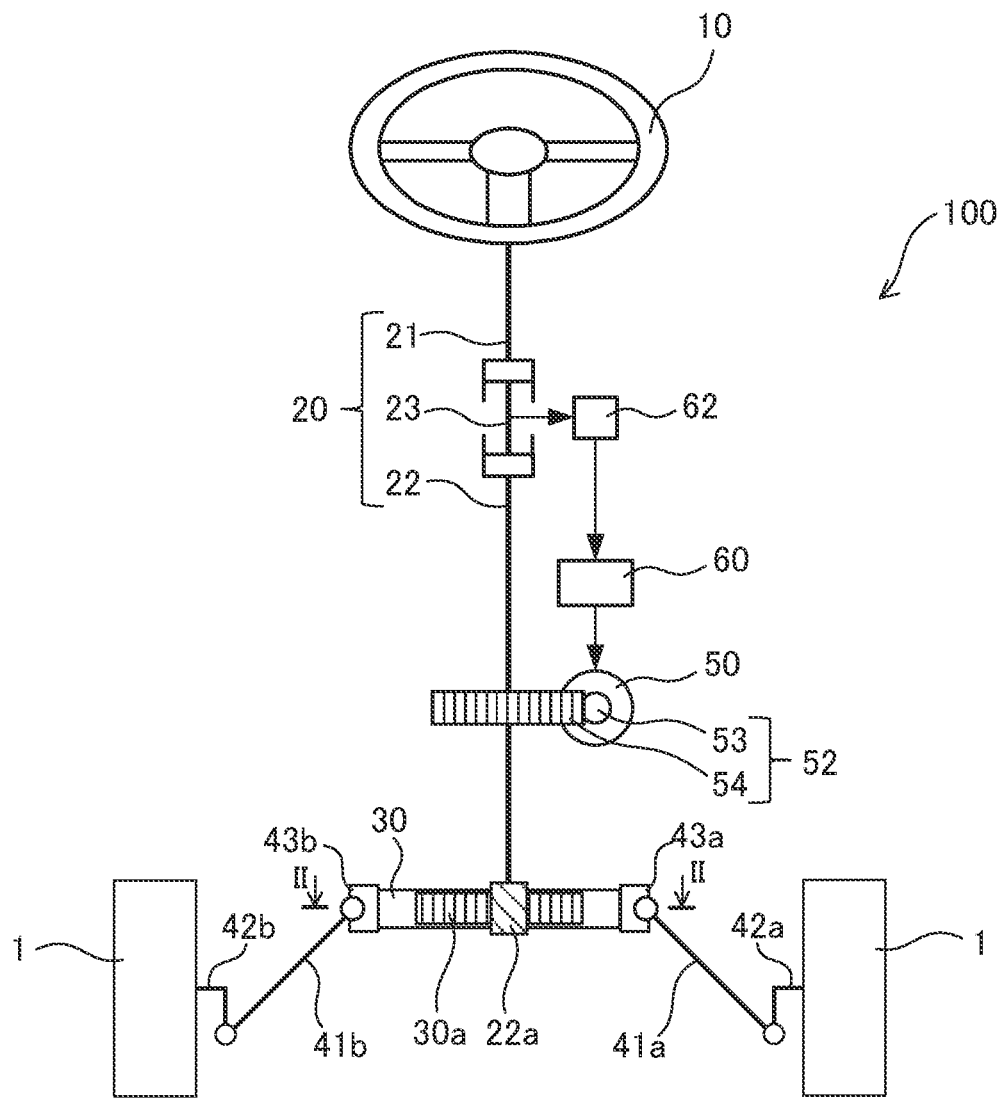
FIG. 1 is a diagram illustrating a configuration of a steering device according to an embodiment of the present invention.
Figure 2:
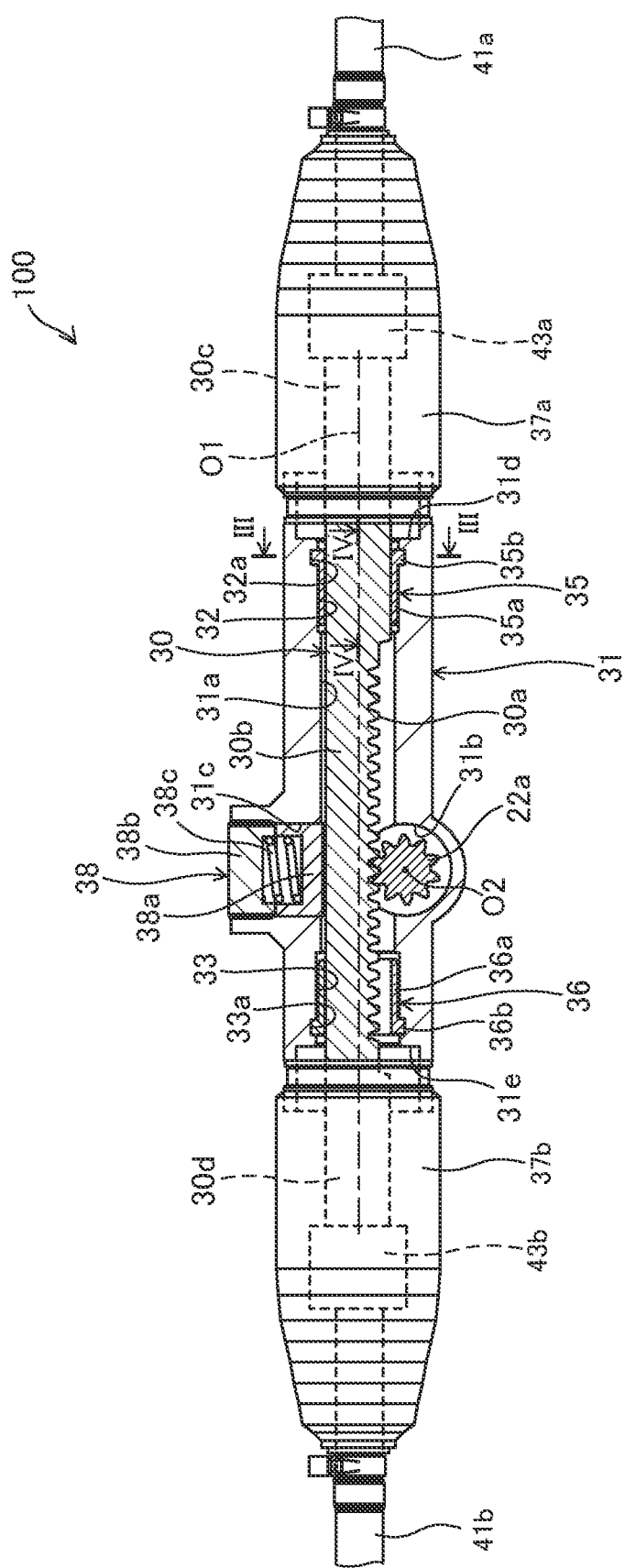
FIG. 2 is a partial cross-sectional diagram illustrating a part of a cross section taken along a line II-II of FIG. 1.

A steering device 100 according to an embodiment of the present invention will be described with reference to FIGS. 1 and 2. FIG. 1 is a diagram illustrating a configuration of the steering device 100, and FIG. 2 is a partial cross-sectional diagram illustrating a part of a cross section taken along a line II-II of FIG. 1.

The steering device 100 is a device mounted on a vehicle to turn wheels 1 by converting the steering torque added to a steering wheel 10 by a driver. Hereinafter, an exemplary case in which the steering device 100 is an electric power steering device having a steering force assisting function will be described.

As illustrated in FIG. 1, the steering device 100 includes a steering shaft 20 that is rotated by the steering torque input from the steering wheel 10, and a rack shaft 30 serving as a turning shaft that turns the wheels 1 according to the rotation of the steering shaft 20.

The steering shaft 20 is configured by an input shaft 21 that is rotated according to a driver's steering operation for operating the steering wheel 10, an output shaft 22 that causes a displacement of the rack shaft 30, and a torsion bar 23 that joins the input shaft 21 and the output shaft 22.

The rack shaft 30 is a shaft-shaped member provided so as to extend in the right-and-left direction of the vehicle, and is joined to one wheel 1 via a first tie-rod 41a and a first knuckle arm 42a and is joined to the other wheel 1 via a second tie-rod 41b and a second knuckle arm 42b.

The first and second tie-rods 41a and 41b are swingably joined to the rack shaft 30 via first and second ball joints 43a and 43b serving as joining portions provided at both ends of the rack shaft 30, respectively. The joining portions for joining the rack shaft 30 to the first and second tie-rods 41a and 41b are not limited to the first and second ball joints 43a and 43b, and any other type of universal joints may be used.

The output shaft 22 and the rack shaft 30 are joined to each other via a rack and pinion mechanism configured by a pinion gear 22a provided at an end of the output shaft 22 and a rack gear 30a provided on the rack shaft 30. The pinion gear 22a and the rack gear 30a are meshed with each other, so that the torque of the output shaft 22 is converted into the road in the direction of an axial center O1 of the rack shaft 30 via the pinion gear 22a and the rack gear 30a and transmitted to the rack shaft 30. As a result, the rack shaft 30 causes a displacement in the direction of the axial center O1 in response to the torque transmitted, and turns the wheels 1 via the first and second tie-rods 41a and 41b.

Further, the steering device 100 includes an electric motor 50 that is driven to assist the steering force according to the steering operation, and a speed reduction unit 52 that decreases the rotation of the electric motor 50 and transmits it to the steering shaft 20.

The speed reduction unit 52 is a worm gear mechanism configured by a worm shaft 53 driven by the electric motor 50 and a worm wheel 54 provided on the output shaft 22. The worm shaft 53 and the worm wheel 54 are meshed with each other, so that the torque of the electric motor 50 is transmitted to the output shaft 22 via the worm shaft 53 and the worm wheel 54. The torque transmitted from the electric motor 50 to the output shaft 22 is further transmitted to the rack shaft 30 via the pinion gear 22a and the rack gear 30a.

The steering device 100 further includes a torque sensor 62 that detects the torque acting on the torsion bar 23 and a controller 60 that controls the driving of the electric motor 50 according to a detection value of the torque sensor 62.

The controller 60 is configured by a microcomputer including a central processing unit (CPU) that performs arithmetic processing, a read-only memory (ROM) that stores control programs and the like that are executed by the CPU, and a random access memory (RAM) that stores calculation results obtained by the CPU or the like. The controller 60 may be configured by a single microcomputer, or may be configured by a plurality of microcomputers.

The torque sensor 62 detects the steering torque applied to the input shaft 21 according to a driver's steering operation, and outputs a voltage signal corresponding to the detected steering torque to the controller 60. Based on the voltage signal obtained from the torque sensor 62, the controller 60 calculates the torque to be output from the electric motor 50 and controls the driving of the electric motor 50 so that the calculated torque can be generated.

As described above, in the steering device 100 having the above-described configuration, the torque sensor 62 detects the steering torque applied to the input shaft 21 and the controller 60 controls the driving of the electric motor 50 based on the detection result so that the steering device 100 can assist the driver's steering operation.

As illustrated in FIG. 2, the steering device 100 further includes a rack housing 31 serving as a housing for accommodating the rack shaft 30, first and second bushes 35 and 36 provided in the rack housing 31 to slidably support the rack shaft 30, a pressing mechanism 38 for pressing the rack shaft 30 against the pinion gear 22a, and first and second boots 37a and 37b covering the first and second ball joints 43a and 43b joining the rack shaft 30 to the first and second tie-rods 41a and 41b.

The rack housing 31 is a tubular member in which a first accommodation hole 31a for accommodating the rack shaft 30 is formed so as to pass therethrough. Further formed in the rack housing 31 are a second accommodation hole 31b formed in a direction intersecting the first accommodation hole 31a so as to accommodate the pinion gear 22a, and a third accommodation hole 31c formed on the side opposite to the portion where the pinion gear 22a and the rack gear 30a mesh with each other, with the axial center O1 of the rack shaft 30 intervening therebetween, so as to accommodate the pressing mechanism 38.

Further, a first assembling hole 32 to which the first bush 35 is assembled is provided at one end of the first accommodation hole 31a, and a second assembling hole 33 to which the second bush 36 is assembled is provided at the other end of the first accommodation hole 31a. The first assembling hole 32 has an annular groove 32a for retaining and positioning the first bush 35. The second assembling hole 33 has an annular groove 33a for retaining and positioning the second bush 36.

Further, an end surface at which the first assembling hole 32 opens is configured as a first regulating surface 31d with which the first ball joint 43a joined to the rack shaft 30 comes into contact. An end surface at which the second assembling hole 33 opens is configured as a second regulating surface 31e with which the second ball joint 43b joined to the rack shaft 30 comes into contact. Therefore, the movement of the rack shaft 30 in the axial direction is restricted by causing the first and second ball joints 43a and 43b to come into contact with the first and second regulating surfaces 31d and 31e provided on the rack housing 31.

The first and second boots 37a and 37b are bellow members formed of rubber or resin (elastomer). The first boot 37a has one end fastened to an end of the rack housing 31 and the other end fastened to the first tie-rod 41a, and covers the first ball joint 43a joining the rack shaft 30 and the first tie-rod 41a. The second boot 37b has one end fastened to an end of the rack housing 31 and the other end fastened to the second tie-rod 41b, and covers the second ball joint 43b joining the rack shaft 30 and the second tie-rod 41b.

Providing the first and second boots 37a and 37b in this manner can prevent water and foreign substances from entering the rack housing 31. Further, providing the first and second boots 37a and 37b can not only maintain lubricity of the first and second ball joints 43a and 43b but also prevent foreign substances and the like from being caught at the first and second ball joints 43a and 43b.

The pressing mechanism 38 has a pressure pad 38a that is slidably in contact with the rack shaft 30, an adjuster 38b screwed to the rack housing 31, and a spring 38c interposed between the pressure pad 38a and the adjuster 38b in a compressed state to urge the pressure pad 38a toward the pinion gear 22a.

Changing the screwing amount of the adjuster 38b can adjust the set road of the spring 38c, and can change the force for pushing the rack shaft 30 against the pinion gear 22a. Urging the rack shaft 30 toward the pinion gear 22a in this manner can reduce the backlash between the rack gear 30a and the pinion gear 22a and can reduce tooth hammer noise when the rack shaft 30 is reciprocating in accordance with the rotation of the pinion gear 22a.

The first bush 35 is a resin-made cylindrical member, and has a tubular main body part 35a and a flange-like retainer part 35b formed so as to protrude from one end of the main body part 35a toward the outer side in the radial direction. The first bush 35 is fixed to the rack housing 31 by causing the retainer part 35b to be fitted into the annular groove 32a formed in the first assembling hole 32.

The second bush 36 has a shape similar to that of the first bush 35, and is fixed to the rack housing 31 when the retainer part 36b is fitted into the annular groove 33a formed in the second assembling hole 33.

As illustrated in FIG. 2, the rack shaft 30 slidably supported by the first and second bushes 35 and 36 each having the above-described shape has a gear part 30b provided on the rack gear 30a, and first and second cylindrical parts 30c and 30d provided at both ends of the gear part 30b. The first cylindrical part 30c and the gear part 30b neighboring the first cylindrical part 30c are slidably supported by the first bush 35. The second cylindrical part 30d and the gear part 30b neighboring the second cylindrical part 30d are slidably supported by the second bush 36.

Here, because of the presence of grease or lubricating oil, there is almost no gap through which air can pass between the first and second bushes 35 and 36 and the rack housing 31 or between the first and second bushes 35 and 36 and the rack shaft 30. Therefore, the spaces inside the first and second boots 37a and 37b are kept in almost hermetically sealed state.

If air cannot enter or leave the spaces inside the first and second boots 37a and 37b, no air flows into the first and second boots 37a and 37b, for example, even when the first and second boots 37a and 37b expand according to the reciprocating movement of the rack shaft 30. Therefore, the first and second boots 37a and 37b are recessed inward in the radial direction and may come into contact with the first and second ball joints 43a and 43b.

Further, if air cannot enter or leave the spaces inside the first and second boots 37a and 37b, no air flows out from the first and second boots 37a and 37b, for example, even when the first and second boots 37a and 37b contract according to the reciprocating movement of the rack shaft 30. Therefore, the first and second boots 37a and 37b swell outward in the radial direction and may come into contact with members disposed around them.

If the above-described contact with other members and extreme deformation are repeated, the first and second boots 37a and 37b will be damaged eventually and preventing water or the like from entering the rack housing 31 will become impossible. As a result, the steering device 100 may not function normally.

Further, in a vehicle whose width is relatively narrow, such as an all-terrain vehicle (ATV) that can travel on various terrains including uneven grounds, or a multi-purpose four-wheeled vehicle (SSV: Side by Side Vehicle), the length of the rack housing 31 in the vehicle width direction is relatively short and therefore the first and second bushes 35 and 36 support not only the first and second cylindrical parts 30c and 30d of the rack shaft 30 but also the gear part 30b.

When the first and second bushes 35 and 36 support the first and second cylindrical parts 30c and 30d, the spaces inside the first and second boots 37a and 37b are kept in almost hermetically sealed state. On the other hand, when the first and second bushes 35 and 36 support the gear part 30b, the spaces inside the first and second boots 37a and 37b are brought into a state where they communicate with the space inside the first accommodation hole 31a.

As described above, air flows into and out of the spaces inside the first and second boots 37a and 37b when the spaces inside the first and second boots 37a and 37b are switched from the hermetically sealed state to the state where they communicate with the space inside the first accommodation hole 31a. Therefore, the first and second boots 37a and 37b may be suddenly deformed, and the sound of rapid air flow may be generated as an abnormal noise.

In order to avoid the above-mentioned phenomenon, the present embodiment causes the space inside the first boot 37a and the space inside the second boot 37b to constantly communicate with each other so as to enable air to flow between the space inside the first boot 37a and the space inside the second boot 37b.

Figure 3:
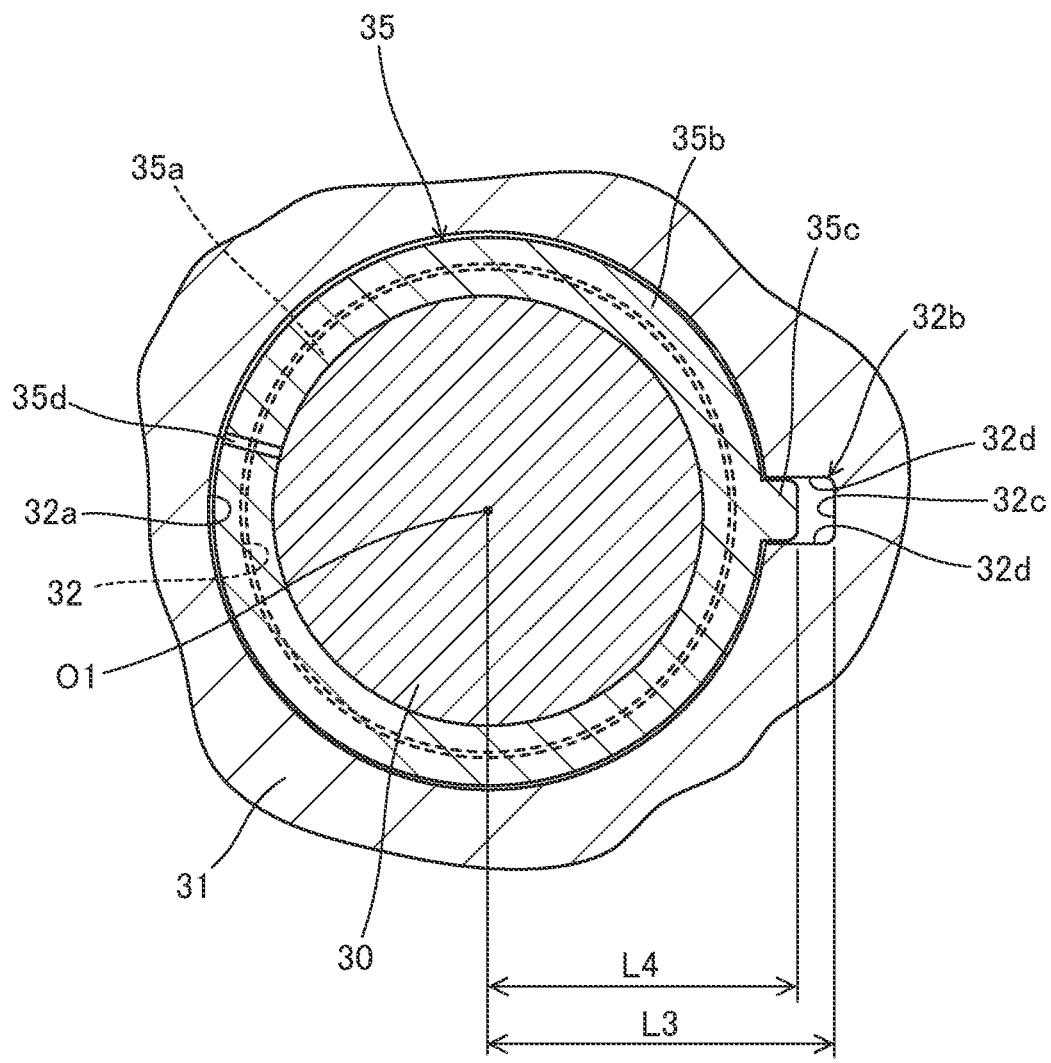
FIG. 3 is a partial cross-sectional diagram illustrating a part of a cross section taken along a line III-III of FIG. 2.
Figure 4:
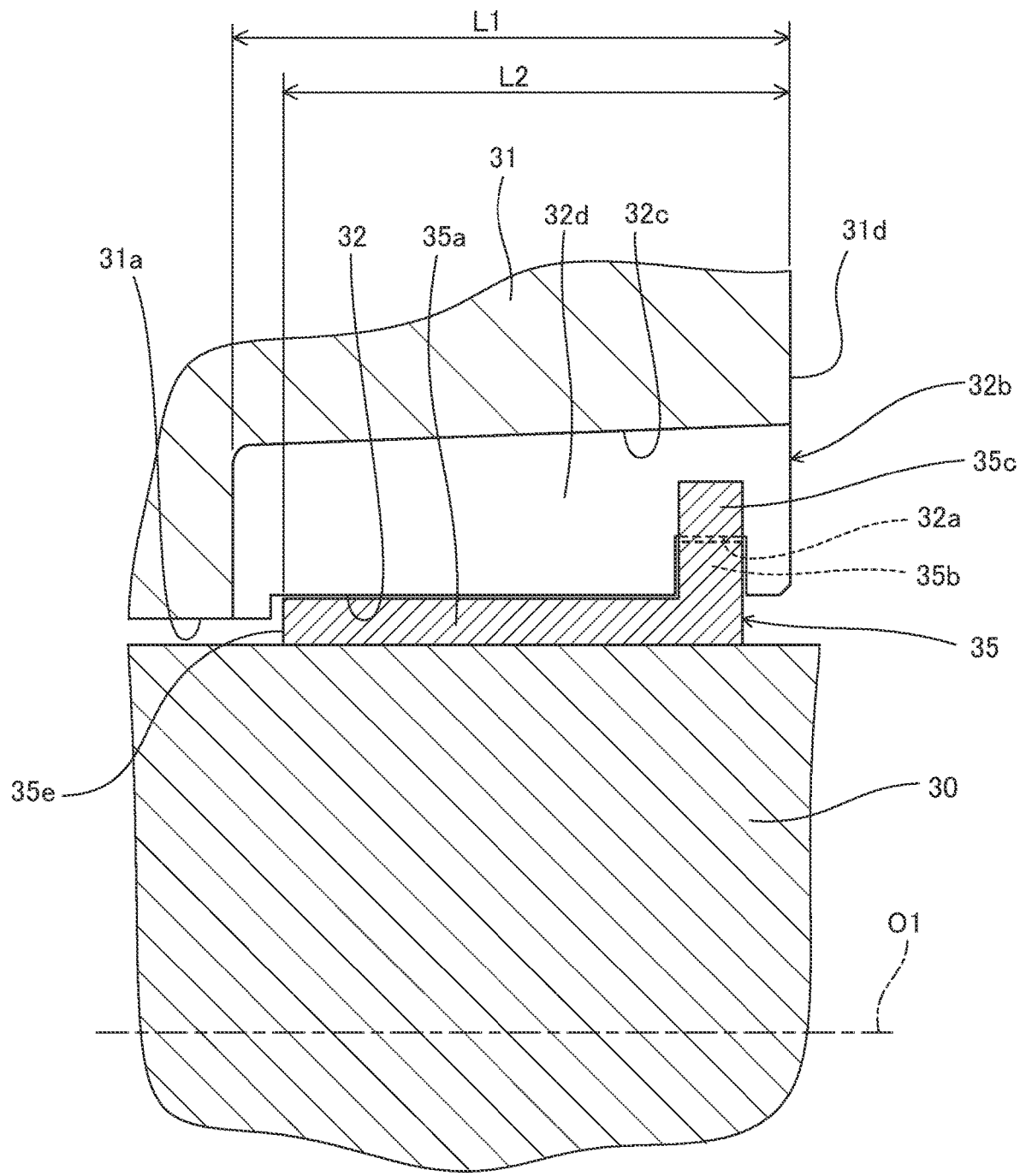
FIG. 4 is a partial cross-sectional diagram illustrating a part of a cross section taken along a line IV-IV of FIG. 2.

Next, with reference to FIGS. 3 and 4, an exemplary configuration for causing the space inside the first boot 37a and the space inside the second boot 37b to communicate with each other will be described. FIG. 3 is a partial diagram illustrating a part of a cross section taken along a line III-III of FIG. 2. FIG. 4 is a partial cross-sectional diagram illustrating a part of a cross section taken along a line IV-IV of FIG. 2.

As illustrated in FIG. 3, in addition to the above-described retainer part 35b, the first bush 35 has a protrusion part 35c provided so as to protrude radially outward from the retainer part 35b, and a slit 35d provided on the side opposite to the protrusion part 35c with the axial center O1 intervening therebetween.

The slit 35d is a cutout formed spirally over the entire length of the first bush 35, and is provided to reduce the outer diameter of the first bush 35 when the first bush 35 is assembled with the rack housing 31.

At the portion where the slit 35d is provided, the contact area with the rack shaft 30 is reduced by the area of the slit 35d and therefore the surface pressure is increased. Therefore, if a large road acts on this portion, the first bush 35 may be damaged. The protrusion part 35c is provided for positioning of the first bush 35 in the circumferential direction, so that the portion where the slit 35d is provided is arranged at a predetermined position, for example, at a position where a relatively small road acts. In other words, the protrusion part 35c is provided to prevent the first bush 35 from rotating about the axial center O1.

On the other hand, a restriction groove 32b into which the protrusion part 35c is inserted is formed in the first assembling hole 32 of the rack housing 31. The restriction groove 32b is a groove having a bottom surface 32c and side surfaces 32d facing each other, and is formed on the inner peripheral surface of the first assembling hole 32 along the axial center O1 of the rack shaft 30.

When the protrusion part 35c of the first bush 35 is inserted into the restriction groove 32b, the movement of the protrusion part 35c in the circumferential direction is restricted by the side surfaces 32d of the restriction groove 32b. As a result, the first bush 35 is restricted from rotating about the axial center O1, and the portion where the slit 35d is provided is held in a state where it is located at the predetermined position.

In general, when the vehicle is traveling, the rack shaft 30 is pushed against the rack housing 31 upward or downward in the vertical direction due to vibrations during the traveling. Therefore, the positional relationship between the restriction groove 32b and the protrusion part 35c is set in such a manner that the portion where the slit 35d is provided is arranged so as not to coincide with the upward or downward position in the vertical direction.

Further, the restriction groove 32b is opened on the first regulating surface 31d. A first length L1 that is the length of the restriction groove 32b in the direction of the axial center O1 of the rack shaft 30 from the first regulating surface 31d being this opening end surface is set to be longer than a second length L2 that is the length from the first regulating surface 31d to an insertion tip surface 35e of the first bush 35 assembled with the first assembling hole 32.

Therefore, the restriction groove 32b is opened to the first accommodation hole 31a at the portion adjacent to the center of the rack housing 31 than the portion where the first bush 35 is provided. In other words, the restriction groove 32b is in the state where it communicates with the space inside the first accommodation hole 31a, without being blocked by the first bush 35.

Further, as illustrated in FIG. 3, a third length L3 that is the length from the axial center O1 of the rack shaft 30 to the bottom surface 32c of the restriction groove 32b is set to be longer than a fourth length L4 that is the length from the axial center O1 of the rack shaft 30 to the tip of the protrusion part 35c, so that a passage in which air can flow is formed between the bottom surface 32c and the protrusion part 35c.

With the restriction groove 32b formed in this manner, the space faced by the first regulating surface 31d, that is, the space inside the first boot 37a, constantly communicates with the space inside the first accommodation hole 31a via the passage formed between the bottom surface 32c and the protrusion part 35c and the restriction groove 32b formed so as to extend beyond the insertion tip surface 35e of the first bush 35.

Since no member comes into contact with the bottom surface 32c of the restriction groove 32b, the bottom surface 32c may remain as a cast surface in the case of manufacturing the rack housing 31 by casting. In this case, the bottom surface 32c is not parallel to the axial center O1, but is formed so as to be slightly inclined with respect to the axial center O1 according to draft.

On the other hand, a restriction groove (not illustrated) similar to the restriction groove 32b is also formed in the second assembling hole 33 to which the second bush 36 is assembled. Therefore, the space inside the second boot 37b constantly communicates with the space inside the first accommodation hole 31a, via the restriction groove formed in the second assembling hole 33.

As a result, the space inside the first boot 37a and the space inside the second boot 37b are kept in the state where they constantly communicate with each other via the space inside the first accommodation hole 31a.

Accordingly, for example, in FIG. 2, if the rack shaft 30 moves to the right so that the first boot 37a expands and the second boot 37b contracts, the air in the contracted space inside the second boot 37b will flow into the expanded space inside the first boot 37a via the space inside the first accommodation hole 31a. Therefore, the first boot 37a can be prevented from being recessed inward in the radial direction, and the second boot 37b can be prevented from swelling outward in the radial direction. As a result, the first and second boots 37a and 37b can be prevented from being damaged.

Further, since the space inside the first boot 37a constantly communicates with the space inside the second boot 37b, even when the state where the first and second bushes 35 and 36 support the first and second cylindrical parts 30c and 30d is switched to the state where the first and second bushes 35 and 36 support the gear part 30b, the flow of air into or out of the spaces inside the first and second boots 37a and 37b does not change so much. Therefore, not only the first and second boots 37a and 37b can be prevented from being suddenly deformed, but also the occurrence of the sound of flowing air can be suppressed.

Further, in the present embodiment, in order to enable air to smoothly move between the space inside the first boot 37a and the space inside the second boot 37b according to the reciprocating movement of the rack shaft 30, the size of a minimum passage cross-sectional area of the passage through which the space inside the first boot 37a and the space inside the second boot 37b communicate with each other is set based on the flow path resistance imparted to the air moving between the space inside the first boot 37a and the space inside the second boot 37b.

Specifically, for example, the third length L3 is set in such a manner that, when the cross-sectional area of the passage formed between the bottom surface 32c and the protrusion part 35c is the smallest, the magnitude of the flow path resistance imparted to the flow of air becomes equal to or less than a predetermined value when the maximum flow rate of air flows through this portion. For example, increasing the difference in length between the third length L3 and the fourth length L4 so as to increase the cross-sectional area of the passage formed between the bottom surface 32c and the protrusion part 35c can reduce the flow path resistance. That is, setting the third length L3 to be relatively long in length compared to the fourth length L4 can reduce the flow path resistance. However, the wall thickness of the rack housing 31 restricts the size setting of the third length L3. Further, setting the fourth length L4 to be relatively short compared to the third length L3 can reduce the flow path resistance. However, the size setting of the fourth length L4 is limited to a range in which the protrusion part 35c can exert a rotation restricting function.

Further, for example, the first length L1 is set in such a manner that, when the cross-sectional area of the passage formed between the insertion tip surface 35e and the restriction groove 32b is the smallest, the magnitude of the flow path resistance imparted to the flow of air becomes equal to or less than a predetermined value when the maximum flow rate of air flows through this portion. Although increasing the first length L1 can reduce the flow path resistance, the size setting of the first length L1 is restricted by the position and size of each of the second accommodation hole 31b and the third accommodation hole 31c formed in the rack housing 31.

The magnitude of the predetermined value of the flow path resistance is experimentally set considering the deformation states of respective boots 37a and 37b. Specifically, when the rack shaft 30 is moved at the maximum speed, the deformation amount of each boot 37a or 37b in radially outer direction or in radially inner direction is measured by changing the flow path resistance, and the flow path resistance when the measured deformation amount is within a permissible range is set as the predetermined value.

As described above, appropriately setting the size of the minimum passage cross-sectional area of the passage through which the space inside the first boot 37a and the space inside the second boot 37b communicate with each other, specifically, the size of a minimum passage cross-sectional area of the passage formed between the first bush 35 and the restriction groove 32b or the passage formed between the second bush 36 and the restriction groove can surely suppress deformations of respective boots 37a and 37b.

The above-described embodiment brings the following effects.

In the steering device 100, the space inside the first boot 37a and the space inside the second boot 37b constantly communicate with each other, via the restriction groove 32b provided in the rack housing 31 to restrict the rotations of the bushes 35 and 36. As described above, using the restriction groove 32b to cause the space inside the first boot 37a and the space inside the second boot 37b to constantly communicate with each other so as to enable air to move between two boots 37a and 37b can suppress extreme deformations of the boots 37a and 37b when the spaces inside respective boots 37a and 37b expand and contract according to the reciprocating movement of the rack shaft 30.

Next, an exemplary modification of the above-described embodiment will be described.

In the above-described embodiment, two bushes 35 and 36 are provided to slidably support the rack shaft 30. Alternatively, only one bush may be used.

Further, in the above-described embodiment, the turning shaft is the rack shaft 30 having the rack gear 30a. However, the turning shaft is not limited to the rack shaft 30. It may be a shaft-shaped member not provided with the rack gear 30a as long as the steering force for turning the wheels 1 can be transmitted via some transmission mechanism.

Figure 5:
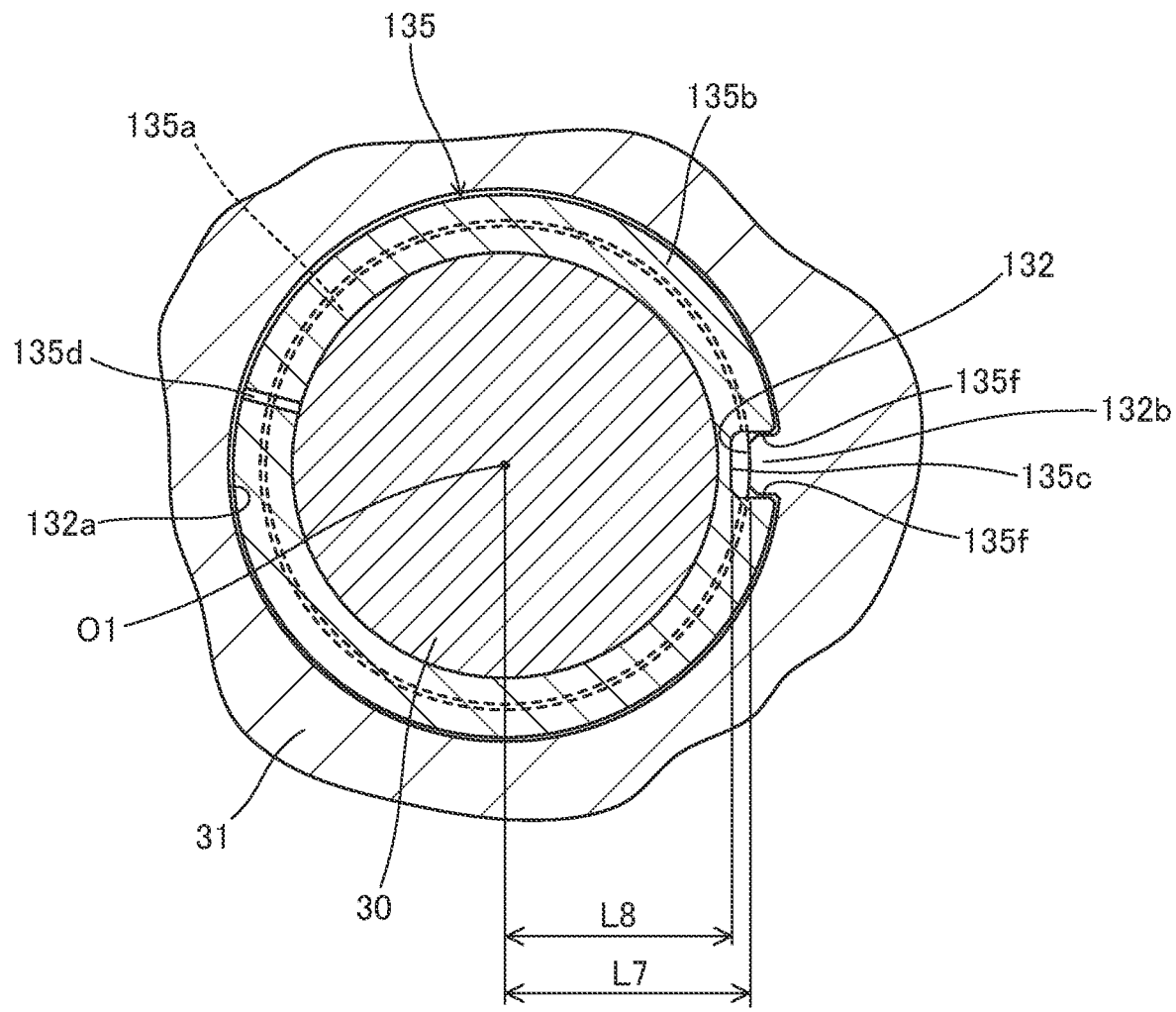
FIG. 5 is a partial cross-sectional diagram illustrating an exemplary modification of the steering device according to the embodiment of the present invention, which is a part corresponding to FIG. 3.
Figure 6:
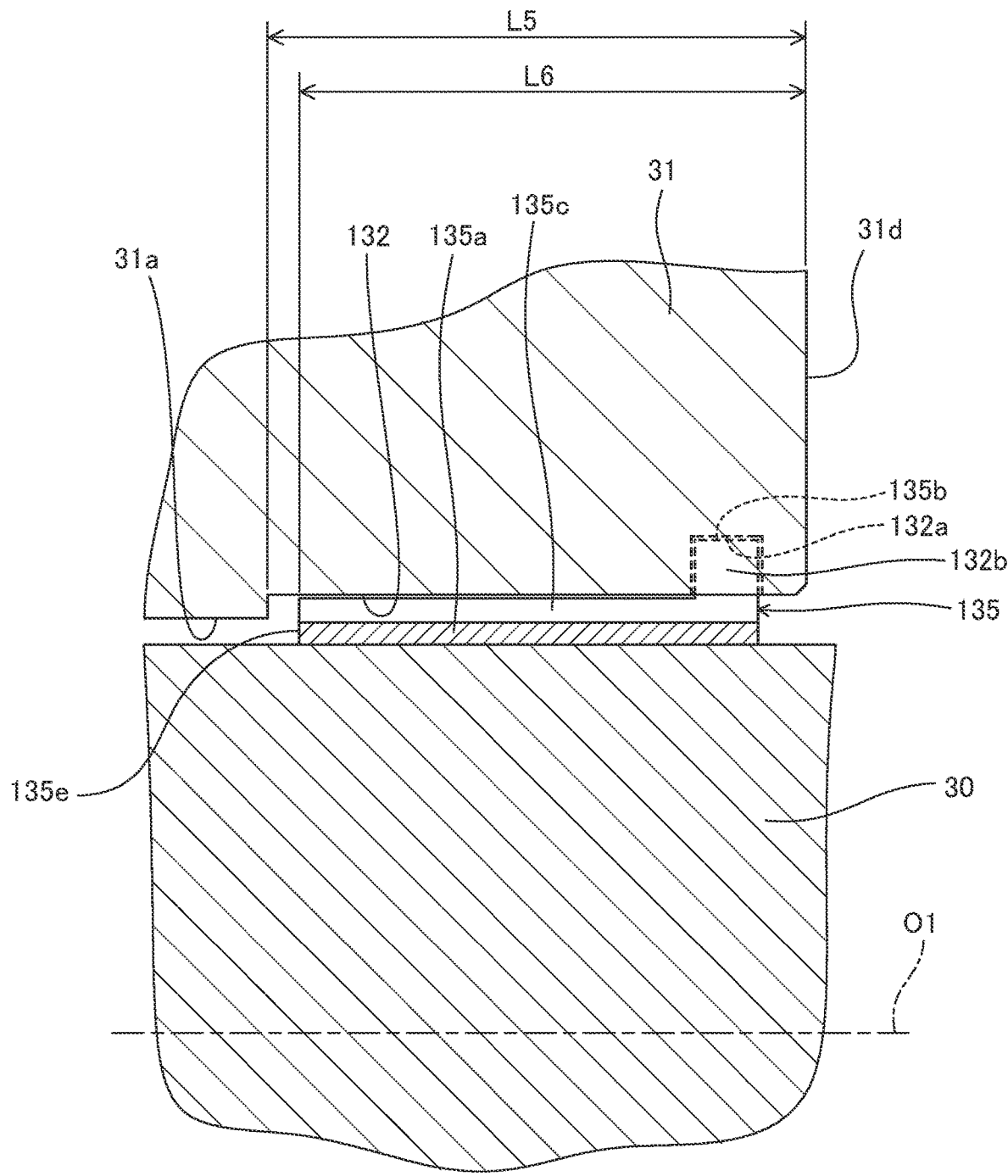
FIG. 6 is a partial cross-sectional diagram illustrating the exemplary modification of the steering device according to the embodiment of the present invention, which is a part corresponding to FIG. 4.

Further, in the above-described embodiment, the protrusion part 35c is formed on the first and second bushes 35 and 36, and the restriction groove 32b into which the protrusion part 35c is inserted is formed in the first assembling hole 32 of the rack housing 31. Alternatively, as illustrated in FIGS. 5 and 6, a configuration in which a protrusion part 132b is formed on the rack housing 31 side and a restriction groove 135c is formed on sides of the first and second bushes 135 and 136 may be adopted. Hereinafter, the exemplary modification illustrated in FIGS. 5 and 6 will be described. FIG. 5 is a diagram illustrating a cross section corresponding to the cross section illustrated in FIG. 3. FIG. 6 is a diagram illustrating a cross section corresponding to the cross section illustrated in FIG. 4.

The first bush 135 in this exemplary modification is a resin-made cylindrical member, and has a tubular main body part 135a and a flange-like retainer part 135b formed so as to protrude from one end of the main body part 135a toward the outer side in the radial direction. The first bush 135 is fixed to the rack housing 31 by causing the retainer part 135b to be fitted into a retaining groove 132a of a first assembling hole 132 formed at one end of the first accommodation hole 31a.

Further, in addition to the above-described retainer part 135b, the first bush 135 has the restriction groove 135c into which the protrusion part 132b provided in the retaining groove 132a is inserted, and a slit 135d provided on the side opposite to the restriction groove 135c with the axial center O1 intervening therebetween. The restriction groove 135c is a groove formed on the main body part 135a and the retainer part 135b along the axial center O1 of the rack shaft 30, and is provided over the entire length of the first bush 135.

The protrusion part 132b is a protrusion formed so as to protrude toward the axial center O1 from the bottom surface of the retaining groove 132a, and a tip surface thereof is formed so as to be flush with the inner peripheral surface of the first assembling hole 132. In other words, the retaining groove 132a is formed in a C shape in a cross-sectional view so that a portion serving as the protrusion part 132b remains, as illustrated in FIG. 5.

When the protrusion part 132b formed in this manner is inserted into the restriction groove 135c of the first bush 135, a side surface 135f of the restriction groove 135c comes into contact with the protrusion part 132b. As a result, the rotation of the first bush 135 about the axial center O1 is restricted. Further, restricting the rotation of the first bush 135 brings the portion where the slit 135d is provided into a state of being arranged at a predetermined position.

Further, as illustrated in FIG. 6, a fifth length L5 that is the length of the first assembling hole 132 in the direction of the axial center O1 of the rack shaft 30 from the first regulating surface 31d being an opening end surface of the first assembling hole 132 is set to be longer than a sixth length L6 that is the length from the first regulating surface 31d to an insertion tip surface 135e of the first bush 135 assembled with the first assembling hole 132. Therefore, the restriction groove 135c formed over the insertion tip surface 135e is brought into a state where it communicates with the space inside the first accommodation hole 31a, without being blocked by the rack housing 31.

Further, as illustrated in FIG. 5, an eighth length L8 that is the length from the axial center O1 of the rack shaft 30 to the bottom surface of the restriction groove 135c is set to be shorter than a seventh length L7 that is the length from the axial center O1 of the rack shaft 30 to the tip of the protrusion part 132b, so that a passage in which air can flow is formed between the bottom surface of the restriction groove 135c and the protrusion part 132b.

With the restriction groove 135c formed in this manner, the space faced by the first regulating surface 31d, that is, the space inside the first boot 37a, constantly communicate with the space inside the first accommodation hole 31a via the passage formed between the bottom surface of the restriction groove 135c and the protrusion part 132b and the passage formed between the restriction groove 135c and the first assembling hole 132.

On the other hand, the second bush 136 (not illustrated) and a second assembling hole 133 (not illustrated) to which the second bush 136 is assembled are formed into similar shapes. Therefore, the space inside the second boot 37b constantly communicates with the space inside the first accommodation hole 31a via the restriction groove formed on the second bush 136.

As a result, even in this exemplary modification, the space inside the first boot 37a and the space inside the second boot 37b are brought into a state where they constantly communicate with each other via the space inside the first accommodation hole 31a. Therefore, effects similar to those of the above-described embodiment can be obtained.

Further, even in this exemplary modification, in order to enable air to smoothly move between the space inside the first boot 37a and the space inside the second boot 37b according to the reciprocating movement of the rack shaft 30, the size of a minimum passage cross-sectional area of the passage through which the space inside the first boot 37a and the space inside the second boot 37b communicate with each other is set based on the flow path resistance imparted to the air moving between the space inside the first boot 37a and the space inside the second boot 37b.

In the above-described exemplary modification, the restriction groove 135c is formed on the main body part 135a and the retainer part 135b along the axial center O1 of the rack shaft 30, but the restriction groove 135c may not be formed on the main body part 135a if air can sufficiently move between two boots 37a and 37b via the restriction groove 135c even in a case where the restriction groove 135c is formed only on the retainer part 135b. Further, in the case of forming the restriction groove 135c only on the retainer part 135b, the size of a minimum passage cross-sectional area of the passage through which the space inside the first boot 37a and the space inside the first accommodation hole 31a communicate with each other may be reduced. Therefore, in order to make the minimum passage cross-sectional area of this passage sufficiently large, the groove through which the restriction groove 135c formed on the retainer part 135b communicates with the space inside the first accommodation hole 31a or the groove through which the restriction groove 135c formed on the retainer part 135b communicates with the space inside the first boot 37a may be formed on the inner peripheral surface of the first assembling hole 132.

Further, the above-described embodiment and the above-described exemplary modification may be combined to realize a configuration in which a protrusion part is provided on either one of the first and second bushes and a restriction groove is provided on the other.

Hereinafter, configurations, functions, and effects of the embodiments of the present invention will be collectively described.

The steering device 100 includes the rack shaft 30 that turns the wheels 1 by transmitting a steering force, the rack housing 31 accommodating the rack shaft 30, the first and second bushes 35 and 36, or 135 and 136, provided in the rack housing 31 to slidably support the rack shaft 30, the first and second tie-rods 41a and 41b swingably joined to the rack shaft 30, the first boot 37a provided on the rack housing 31 to cover the joining portion that joins the rack shaft 30 and the first tie-rod 41a, and the second boot 37b provided on the rack housing 31 to cover the joining portion that joins the rack shaft 30 and the second tie-rod 41b. The protrusion part 35c or 132b is formed on either one of the first and second bushes 35 and 36, or 135 and 136, and the rack housing 31 so as to protrude toward the other. The restriction groove 32b or 135c into which the protrusion part 35c or 132b is inserted is formed on the other along the axial direction of the rack shaft 30. The space inside the first boot 37a and the space inside the second boot 37b constantly communicate with each other via the restriction groove 32b or 135c.

According to this configuration, the space inside the first boot 37a and the space inside the second boot 37b constantly communicate with each other via the restriction groove 32b or 135c provided to restrict the rotations of the bushes 35 and 36. As described above, using the restriction groove 32b or 135c to cause the space inside the first boot 37a and the space inside the second boot 37b to constantly communicate with each other so as to enable air to move between two boots 37a and 37b can suppress extreme deformations of the boots 37a and 37b when the spaces inside respective boots 37a and 37b expand and contract according to the reciprocating movement of the rack shaft 30.

Further, the protrusion part 35c is formed on the first and second bushes 35 and 36, and the restriction groove 32b is formed in the rack housing 31. The rack housing 31 has the first and second regulating surfaces 31d and 31e serving as opening end surfaces where the restriction groove 32b is opened in the direction of the axial center O1 of the rack shaft 30. The first length L1 that is the length of the restriction groove 32b in the direction of the axial center O1 is set to be longer than the second length L2 that is the length between the insertion tip surface 35e of the first and second bushes 35 and 36 inserted in the rack housing 31 and the first and second regulating surfaces 31d and 31e.

According to this configuration, the first length L1 that is the length of the restriction groove 32b in the direction of the axial center O1 of the rack shaft 30 from the first and second regulating surfaces 31d and 31e being the opening end surfaces is set to be longer than the second length L2 that is the length from the first and second regulating surfaces 31d and 31e to the insertion tip surface 35e of the first and second bushes 35 and 36 assembled with the first and second assembling holes 32 and 33. Therefore, the restriction groove 32b is opened to the first accommodation hole 31a at the portion adjacent to the center of the rack housing 31 than the portion where the first and second bushes 35 and 36 are provided, and is in the state where it constantly communicates with the space inside the first accommodation hole 31a. Forming the restriction groove 32b in this manner causes the space inside the first boot 37a and the space inside the second boot 37b to constantly communicate with each other via the space inside the first accommodation hole 31a.

Further, the first and second bushes 35 and 36 have the tubular main body part 35a, and the retainer part 35b formed so as to protrude radially outward from the main body part 35a and engaged with the rack housing 31. The protrusion part 35c is formed so as to protrude radially outward from the retainer part 35b.

According to this configuration, the protrusion part 35c provided to restrict the rotations of the first and second bushes 35 and 36 is formed so as to protrude radially outward from the retainer part 35b. As described above, adopting the configuration in which the protrusion part 35c is formed continuously with the retainer part 35b, instead of forming the protrusion part 35c separately from the retainer part 35b, can simplify the shapes of the first and second bushes 35 and 36, and can reduce manufacturing costs of the first and second bushes 35 and 36.

Further, the protrusion part 132b is formed in the rack housing 31, and the restriction groove 135c is formed on the first and second bushes 135 and 136. The rack housing 31 has the first and second regulating surfaces 31d and 31e serving as opening end surfaces where the first and second assembling holes 132 and 133 to which the first and second bushes 135 and 136 are assembled are opened in the direction of the axial center O1 of the rack shaft 30. The fifth length L5 that is the length of the first and second assembling holes 132 and 133 in the direction of the axial center O1 is set to be longer than the sixth length L6 that is the length between the insertion tip surface 135e of the first and second bushes 135 and 136 inserted in the rack housing 31 and the first and second regulating surfaces 31d and 31e.

According to this configuration, the fifth length L5 that is the length of the first and second assembling holes 132 and 133 in the direction of the axial center O1 of the rack shaft 30 from the first and second regulating surfaces 31d and 31e being the opening end surfaces is set to be longer than the sixth length L6 that is the length from the first and second regulating surfaces 31d and 31e to the insertion tip surface 135e of the first and second bushes 135 and 136 assembled with the first and second assembling holes 132 and 133. Therefore, the restriction groove 135c is opened to the first accommodation hole 31a without being blocked by the rack housing 31, and is in a state where it constantly communicates with the space inside the first accommodation hole 31a. Forming the restriction groove 135c in this manner causes the space inside the first boot 37a and the space inside the second boot 37b to constantly communicate with each other via the space inside the first accommodation hole 31a.

Further, the first and second bushes 135 and 136 have the tubular main body part 135a, and the retainer part 135b formed so as to protrude radially outward from the main body part 135a and engaged with the rack housing 31. The restriction groove 135c is formed on the main body part 135a and the retainer part 135b.

According to this configuration, the restriction groove 135c provided to restrict the rotations of the first and second bushes 135 and 136 is formed on the main body part 135a and the retainer part 135b. Forming the restriction groove 135c in this manner over the entire length of the first and second bushes 135 and 136, instead of a part of the first and second bushes 135 and 136, can simplify the shapes of the first and second bushes 135 and 136, and can reduce manufacturing costs of the first and second bushes 135 and 136.

Further, the cross-sectional area of the passage formed by the restriction groove 32b or 135c so that the space inside the first boot 37a and the space inside the second boot 37b communicate with each other is set based on the flow path resistance imparted to the air moving between the space inside the first boot 37a and the space inside the second boot 37b according to the reciprocating movement of the rack shaft 30.

According to this configuration, the size of the cross-sectional area of the passage formed by the restriction groove 32b or 135c is set based on the flow path resistance imparted to the air moving between the space inside the first boot 37a and the space inside the second boot 37b. Setting the size of the cross-sectional area of the passage so that the flow path resistance imparted to the air moving between the space inside the first boot 37a and the space inside the second boot 37b becomes smaller than a predetermined value enables the air to smoothly flow between the space inside the first boot 37a and the space inside the second boot 37b. Enabling the air to smoothly flow between the space inside the first boot 37a and the space inside the second boot 37b as described above can surely suppress extreme deformations of the boots 37a and 37b.

Further, at least a part of the surface configuring the restriction groove 32b is a cast surface.

According to this configuration, the restriction groove 32b has the cast surface as at least a part of the surface thereof. Leaving the cast surface as a part of the restriction groove 32b as described above can reduce cutting processes required for forming the restriction groove 32b and can reduce processing costs. As a result, manufacturing costs of the steering device 100 can be reduced.

Further, the first and second bushes 35 and 36, or 135 and 136, are made of resin.

According to this configuration, the first and second bushes 35 and 36, or 135 and 136, are resin-made products. Therefore, compared with a case where the first and second bushes 35 and 36, or 135 and 136, are made of metal, the first and second bushes 35 and 36, or 135 and 136, are light in weight. As a result, the weight of the steering device 100 can be reduced.

Embodiments of the present invention were described above, but the above embodiments are merely examples of applications of the present invention, and the technical scope of the present invention is not limited to the specific constitutions of the above embodiments.

This application claims priority based on Japanese Patent Application No. 2019-130500 filed with the Japan Patent Office on Jul. 12, 2019, the entire contents of which are incorporated into this specification by reference.

The invention claimed is:

1. A steering device, comprising:
a turning shaft configured to turn wheels by transmitting a steering force;
a housing configured to accommodate the turning shaft;
a bush provided in the housing to slidably support the turning shaft;
first and second tie-rods swingably joined to the turning shaft;
a first boot provided on the housing to cover a first joining part that joins the turning shaft and the first tie-rod; and
a second boot provided on the housing to cover a second joining part that joins the turning shaft and the second tie-rod, wherein
either one of the bush and the housing has a protrusion part formed so as to protrude toward the other, and the other has a restriction groove into which the protrusion part is inserted,
a space inside the first boot and a space inside the second boot constantly communicate with each other via the restriction groove, and
the restriction groove extends in an axial direction of the turning shaft such that the bush is restricted from rotating about an axial center of the turning shaft by the protrusion part inserted into the restriction groove.

2. A steering device, comprising:
a turning shaft configured to turn wheels by transmitting a steering force;
a housing configured to accommodate the turning shaft;
a bush provided in the housing to slidably support the turning shaft;
first and second tie-rods swingably joined to the turning shaft;
a first boot provided on the housing to cover a first joining part that joins the turning shaft and the first tie-rod; and
a second boot provided on the housing to cover a second joining part that joins the turning shaft and the second tie-rod, wherein
either one of the bush and the housing has a protrusion part formed so as to protrude toward the other, and the other has a restriction groove into which the protrusion part is inserted so as to be formed along an axial direction of the turning shaft,
a space inside the first boot and a space inside the second boot constantly communicate with each other via the restriction groove,
the protrusion part is formed on the bush, and the restriction groove is formed in the housing,
the housing has an opening end surface where the restriction groove is opened in the axial direction of the turning shaft, and
a length of the restriction groove in the axial direction is longer than a length between an insertion tip surface of the bush inserted in the housing and the opening end surface.

3. A steering device, comprising:
a turning shaft configured to turn wheels by transmitting a steering force;
a housing configured to accommodate the turning shaft;
a bush provided in the housing to slidably support the turning shaft;
first and second tie-rods swingably joined to the turning shaft;
a first boot provided on the housing to cover a first joining part that joins the turning shaft and the first tie-rod; and
a second boot provided on the housing to cover a second joining part that joins the turning shaft and the second tie-rod, wherein
either one of the bush and the housing has a protrusion part formed so as to protrude toward the other, and the other has a restriction groove into which the protrusion part is inserted so as to be formed along an axial direction of the turning shaft,
a space inside the first boot and a space inside the second boot constantly communicate with each other via the restriction groove,
the protrusion part is formed in the housing, and the restriction groove is formed on the bush,
the housing has an opening end surface where an assembling hole to which the bush is assembled is opened in the axial direction of the turning shaft, and
a length of the assembling hole in the axial direction is longer than a length between an insertion tip surface of the bush inserted in the housing and the opening end surface.

4. The steering device according to claim 3, wherein
the bush has a tubular main body part and a retainer part formed so as to protrude radially outward from the main body part, the retainer part being engaged with the housing, and
the restriction groove is formed on the main body part and the retainer part.

5. The steering device according to claim 1, wherein
a cross-sectional area of a passage formed by the restriction groove such that the space inside the first boot and the space inside the second boot communicate with each other is set based on a resistance imparted to air moving between the space inside the first boot and the space inside the second boot according to a reciprocating movement of the turning shaft.

6. The steering device according to claim 2, wherein
the bush has a tubular main body part and a retainer part formed so as to protrude radially outward from the main body part, the retainer part being engaged with the housing, and the protrusion part is formed so as to protrude radially outward from the retainer part.

* * * * *